United States Patent
Hartwich et al.

(10) Patent No.: US 10,953,451 B2
(45) Date of Patent: Mar. 23, 2021

(54) METAL SHEET WITH CONTOUR CUT FOR VIBRATION REDUCTION

(71) Applicant: Friedrich Graepel AG, Löningen (DE)

(72) Inventors: Ewald Hartwich, Molbergen (DE); Marc Bartke, Cloppenburg (DE); Normann Willimek, Hoheging (DE)

(73) Assignee: Friedrich Graepel AG, Löningen (DE)

( * ) Notice: Subject to any disclaimer, the term of this patent is extended or adjusted under 35 U.S.C. 154(b) by 126 days.

(21) Appl. No.: 16/281,148

(22) Filed: Feb. 21, 2019

(65) Prior Publication Data

US 2020/0269304 A1 Aug. 27, 2020

(51) Int. Cl.
| | |
|---|---|
| *B21D 28/10* | (2006.01) |
| *B21D 5/02* | (2006.01) |
| *B21D 26/021* | (2011.01) |
| B21D 35/00 | (2006.01) |
| F16F 15/02 | (2006.01) |
| F16F 15/34 | (2006.01) |
| B21D 28/26 | (2006.01) |
| B21D 28/00 | (2006.01) |
| B21D 28/24 | (2006.01) |

(52) U.S. Cl.
CPC .......... *B21D 28/10* (2013.01); *B21D 5/0209* (2013.01); *B21D 26/021* (2013.01); *B21D 28/00* (2013.01); *B21D 28/24* (2013.01); *B21D 28/26* (2013.01); *B21D 35/008* (2013.01); *F16F 15/02* (2013.01); *F16F 15/34* (2013.01); *F16F 2230/36* (2013.01); *Y10T 428/12215* (2015.01); *Y10T 428/12361* (2015.01)

(58) Field of Classification Search
None
See application file for complete search history.

(56) References Cited

U.S. PATENT DOCUMENTS

| | | | |
|---|---|---|---|
| 6,621,658 B1* | 9/2003 | Nashif | B32B 15/08 360/99.19 |
| 6,718,611 B1* | 4/2004 | Lai | B21D 28/265 29/412 |
| 7,534,501 B2* | 5/2009 | Durney | E04C 3/07 428/596 |
| 9,463,518 B2* | 10/2016 | Brutscher et al. | B23D 61/025 83/835 |
| 2015/0027066 A1* | 1/2015 | Desmond | E04D 13/00 52/27 |
| 2015/0240823 A1* | 8/2015 | Parodi | F04D 25/0613 417/369 |

* cited by examiner

*Primary Examiner* — Humera N. Sheikh
*Assistant Examiner* — John D Schneible
(74) *Attorney, Agent, or Firm* — Gudrun E. Huckett

(57) ABSTRACT

A metal sheet with attachment points for attaching the metal sheet to a support structure has a contour cut introduced in a sheet surface of the metal sheet, wherein the contour cut extends transversely to a connection line extending between a first and a second one of the attachment points. The contour cut is positioned relative to the first attachment point such that a vibration line extending as far as the first attachment point when the contour cut is not present is interrupted by the contour cut.

6 Claims, 3 Drawing Sheets

METAL SHEET WITH CONTOUR CUT FOR VIBRATION REDUCTION

BACKGROUND OF THE INVENTION

The present invention relates to a metal sheet with cutouts in the sheet surface and a plurality of attachment points to a support structure.

A metal sheet needs to have good stiffness and good buckling strength for many applications and furthermore it needs to be economical and easy to fabricate. Metal sheets are often single-piece, that is, made from a single sheet blank. A sheet blank is often subjected to numerous punching and forming procedures in order to obtain the desired form of the metal sheet. Often a sheet blank is used with a smaller sheet thickness and made from a material of lesser strength in order to facilitate the various forming, perforating and punching procedures during the machining of the metal sheet. The relatively soft sheet material makes possible the corresponding machining procedures without the material ripping or breaking in this process. Metal sheets are likewise known that are fabricated from a sheet blank and not formed by bending and folding procedures, but rather deep-drawn. For these as well a suitable sheet material needs to be used, having a smaller sheet thickness and/or a relatively lesser strength.

However, because of the softer sheet material, the mechanical loading capacity of the metal sheet made in this way is diminished. The softer sheet material can be more easily placed in vibration. If the metal sheets produced in this way additionally have recesses in the sheet surface, the mechanical loading capacity is even further reduced. This is then particularly detrimental if the metal sheet produced in the described manner is used in applications in which it is subjected to vibrational loads. The vibrations acting upon it may be free or constrained vibrations. The constrained vibrations may originate for example in vibrations of the machine in which the metal sheet is installed. The vibrations may occur in multiple degrees of freedom, especially if the metal sheet is exposed to oscillating forces acting in multiple directions of the degrees of freedom and the flexibility of the metal sheet permits vibrations in multiple directions.

Natural vibrations of structural parts are especially detrimental. Vibrations in metallic structural parts, especially under numerous loading reversals, may place such a burden on the parts that the sheet material will rip or break at particularly stressful locations, even under loading below the yield strength. The loading reversals caused by vibrations result in microplastic processes and changes in the microstructure of the metal sheet material, resulting in material fatigue. In these applications, it is often not possible to use a different sheet material, one with a higher mechanical loading capacity, or this is only possible in a narrow range, because otherwise the punching, perforating, forming and/or deep-drawing machining processes needed for its shaping can no longer be done, or can be done only with disproportionately greater expense.

The problem which the present invention proposes to solve is to make metal sheets, provided with recesses, more tolerant of vibrations.

SUMMARY OF THE INVENTION

The problem is solved for a metal sheet of the generic kind in that a contour cut is introduced in the metal sheet in the sheet surface in the direction of a connection line between two attachment points of the metal sheet, extending in the direction transverse to the direction of the connection line and interrupting a vibration line reaching as far as the attachment point without the contour cut.

Vibrations in metal sheets often occur along the connection lines between two attachment points by which the metal sheet is joined to a support structure. The larger the spacings between individual attachment points of a metal sheet for a given flexibility of the material of the metal sheet, the larger the amplitudes may be with which the material of the metal sheet vibrates between the attachment points for a given impulse force in a vibration line. The larger the amplitudes with which the material of the metal sheet vibrates along a vibration line, the larger the push and pull movements in the lattice structure of the metal molecules in the surface region of the metal sheet which are situated in the vibration line. The thrust movements in the crystal lattice structure of the metal molecules result in local dislocation movements, which occur in the region of local stress increases. Due to repeated strain, regions of local plastic deformations are formed. In the further course of the straining, these result in dislocation configurations which may have a damaging effect due to a concentration of plastic deformations in very small regions. In regions of the material near the surface, fatigue slip bands may form, which then create so-called extrusions and intrusions on the surface of the structural part at 45° to the direction of strain—the largest shear stress and therefore the preferred direction of the dislocation movement, the Mohr stress circle, which then act as sharp notches and result in micro cracks. These expand under further loading to form fatigue fractures.

The stress increases and thus the dislocation movements occur along a vibration line in the metal sheet, because the vibration-caused peak forces in the crystalline material of the metal sheet are greatest in the trend of the vibration line. If, now, a contour cut is deliberately made in the material of the metal sheet transversely to the direction of vibration, the vibration line will be interrupted at this place. The two material sections of the metal sheet adjoining the contour cut in the direction of the vibration line can now occupy different angular positions relative to each other during a vibration, without any push or pull forces being exerted on the crystalline material from the vibrational movement. Vibration-caused dislocation configurations can no longer occur in the region of the contour cut. The crystalline material of the metal sheet, however, will still be subjected to substantially diminished push and pull forces from the vibration-caused peak forces. The probability of fatigue fractures occurring at this location is substantially decreased. Because the direct line of connection and force between attachment points is interrupted in the area of the contour cut, the lines of force assume a trend differing from the direct line of force between attachment points, the trend running around the contour cut. Owing to the deflecting of force around the direct connection line, the forces producing a vibration in one amplitude direction partly act in a different direction, deviating from the original vibration line, so that the amplitudes of the vibrations still occurring are decreased. Because of the lines of force now running in the form of an arc between attachment points, the forces acting on the metal sheet are now distributed over a larger area of the sheet surface.

By a contour cut is meant an incision in the material of the metal sheet which prevents a vibration transmission across the contour cut. The contour cut may be narrower than, but also broader than 1 mm. The contour cut can be introduced by lasering, punching, milling, cutting or the like in the material of the metal sheet.

According to one embodiment of the invention, the contour cut emerges at its ends in the direction transverse to the connection line into cut lines which are traced in an arc around the ends towards the connection line. The arc-shaped cut lines at the ends of the contour cut in the direction transverse to the connection line prevent the lines of force from ripping open the contour cut at these ends. Without the arc-shaped cut lines, the lines of force attacking the ends would form notch cracks, by which the contour cut would become increasingly longer and rip open. The arc-shaped cut lines divert the lines of force from the ends and divert them further into the surface of the metal sheet around the contour cut. A further unwanted ripping open of the contour cut transversely to the connection line is prevented in this way.

According to one embodiment of the invention, the contour cut is arranged in the area of the stress transition from the attachment point to the freely vibrating sheet. Owing to the connection of the attachment points to the support structure, the immediate surrounding region around an attachment point is more strongly braced against vibrational movements. The attachment point can be connected by screw, welding, gluing or some other joining technique to the support structure and thereby divert the acting forces into the support structure. Regardless of the joining technique used, the material of the metal sheet is much more rigid in the immediate surroundings of the attachment point by virtue of its bracing against the support structure than in other areas of the metal sheet. However, the supporting effect of the support structure on the material of the metal sheet diminishes with distance of the metal sheet away from the attachment point. The stiffness of the material of the metal sheet decreases very greatly in this region, while the vibration-caused stress in the material of the metal sheet increases greatly in this narrow transitional region. Without a contour cut, the stiffness gradient in this transitional region is very steep. In this region, due to the high stress found here in a narrow distance band away from the attachment point, stress increases and dislocation movements may occur as a consequence of vibrations. If a contour cut is made in this region of the stress transition, the stiffness gradient of the metal sheet decreases significantly in this region. Owing to the more shallow stiffness gradients, the stress loading in the transitional region and thus the risk of vibration-caused material failure also decreases. The positioning and geometry of the contour cut in this region naturally depends also on the geometry of the metal sheet and the technical requirements in the installation situation, which may make necessary a positioning of the contour cut adapted to these.

According to one embodiment of the invention, perforated sheets are used as the metal sheet. Perforated sheets with a rather large number of holes have a large hole fraction of, for example, more than 50% in relation to the overall surface of the metal sheet. The material webs between the holes are often very narrow, depending on the application and the hole pattern, for example in order to afford a low air resistance to air passing through in the case of ventilation grids or a high light pass-through rate for cover or protective grilles. Owing to the relatively slight remaining material fraction in the sheet surface, such perforated sheets can be more easily excited to vibrate than other sheets without perforation. Owing to the contour cuts in the region of the attachment points, however, the perforated sheets achieve significantly higher fatigue strength. In this way, the perforated sheets may also be used in applications where vibrations occur and which have thus far been reserved only for other technical solutions, such as wire grids or the like.

According to one embodiment of the invention, the attachment points and the contour cuts are arranged in the area of the outer edge of the metal sheet. By configuring the attachment points and the contour cuts in the area of the outer edge, the surface of the metal sheet can be fully utilized for the desired function. Such a configuration is also advantageous when the attachment of the metal sheet is only possible in the edge region of the metal sheet without impairing the function.

According to one embodiment of the invention, the sheet has additional relieving cuts in the sheet surface. Depending on the geometry and the stress load on the metal sheet in the particular application, the contour cuts may mean that regions of the metal sheet further away from the attachment points will be subjected to increased stresses, which would result in a material failure there without further steps taken during the service life. In order to specifically relieve these regions, additional relieving cuts can be made there in the metal sheet, by which the stresses are reduced there. The position and the geometrical configuration of a corresponding relieving cut will depend on the technical requirements.

Further features of the invention will emerge from the claims, the figures and the description of the figures. All of the features and combinations of features mentioned above in the description as well as the features and combinations of features mentioned below in the description of the figures and/or shown only in the figures may be used not only in the particular combination indicated, but also in other combinations or standing alone.

BRIEF DESCRIPTION OF THE DRAWINGS

The invention shall now be explained more closely with the aid of a preferred exemplary embodiment and with reference to the enclosed drawings.

DESCRIPTION OF PREFERRED EMBODIMENTS

Figure 1:
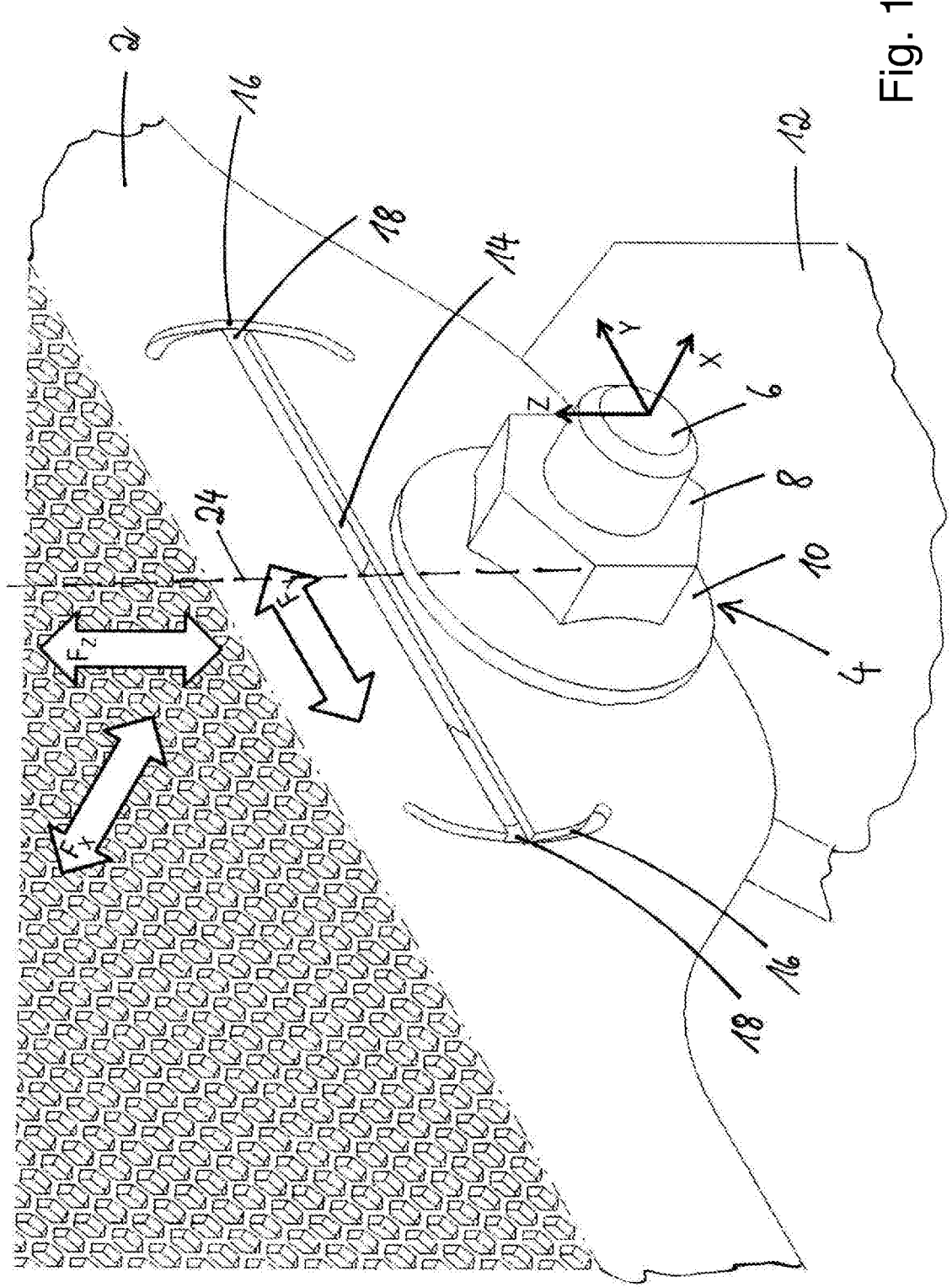
FIG. 1 shows a cutout view of a perforated sheet with a contour cut in an attachment point.

FIG. 1 shows a view of a metal sheet 2, being configured in the exemplary embodiment as a perforated sheet. The metal sheet 2 is joined by an attachment point 4 to a support structure 12. The connection is produced in the exemplary embodiment by a screw 6, which is joined to the support structure 12. For the joining of the metal sheet 2 to the support structure 12, a screw nut 8 with a washer 10 underneath is screwed onto the screw 6. By this connection, the metal sheet 2 is firmly held in the support structure 12.

Besides the attachment point represented in FIG. 1, the metal sheet 2 is further joined by at least one additional attachment point 4 to the support structure 12. The metal sheet 2 is thus secured in its installation position at least at two points.

Adjacent to the attachment point 4 there is a contour cut 14 in the metal sheet 2. The contour cut 14 is an incision in the metal sheet 2 extending transversely to a connection line 24 indicated by broken lines to a further attachment point 4. At the ends 18 the contour cut 14 emerges respectively in an arc-shaped cut line 16, which is traced respectively in an arc-shaped manner around the ends 18 toward the connection line 24.

The metal sheet 2 can be excited to vibrate in the planes $F_x$, $F_y$ and $F_z$. If the metal sheet 2 is vibrating for example in a vibration line corresponding to the arrow direction $F_z$, the metal sheet 2 will perform vibrations in the direction of the arrow $F_x$. If the surface of the metal sheet 2 vibrates along the vibration line running parallel to the connection line 24, the corresponding vibration movements from the sheet surface will end at the contour cut 14. Thus, they cannot continue across the contour cut 14 to the attachment point 4. On the other hand, vibration movements which are transmitted from the support structure 12 across the attachment point 4 to the metal sheet 2 are not directly transmitted along the connection line 24 to the metal sheet 2, but instead remain stuck in the contour cut 14, starting from the attachment point 4.

In order to prevent the contour cut 14 from being lengthened at its ends 18 by crack formation as a consequence of the lines of force acting at its ends 18, the contour cut 14 emerges at the two opposite ends 18 into arc-shaped cut lines 16, which also provide static relief for the lateral surrounding region of the contour cut 14 in the area of the ends 18. This prevents the contour cut 14 from being lengthened beyond the ends 18 and digging in further under vibrational loading.

Since no holding forces can be transmitted between the attachment point 4 and the adjacent sheet blank across the contour cut 14, the lines of force for the fixation of the position and the supporting of the metal sheet 2 flow around the line of the contour cut 14 and around the two arcs of the cut line 16. There is still adequately broad and thick sheet material of the metal sheet 2 present here to introduce adequate holding forces into the metal sheet 2.

Figure 2:
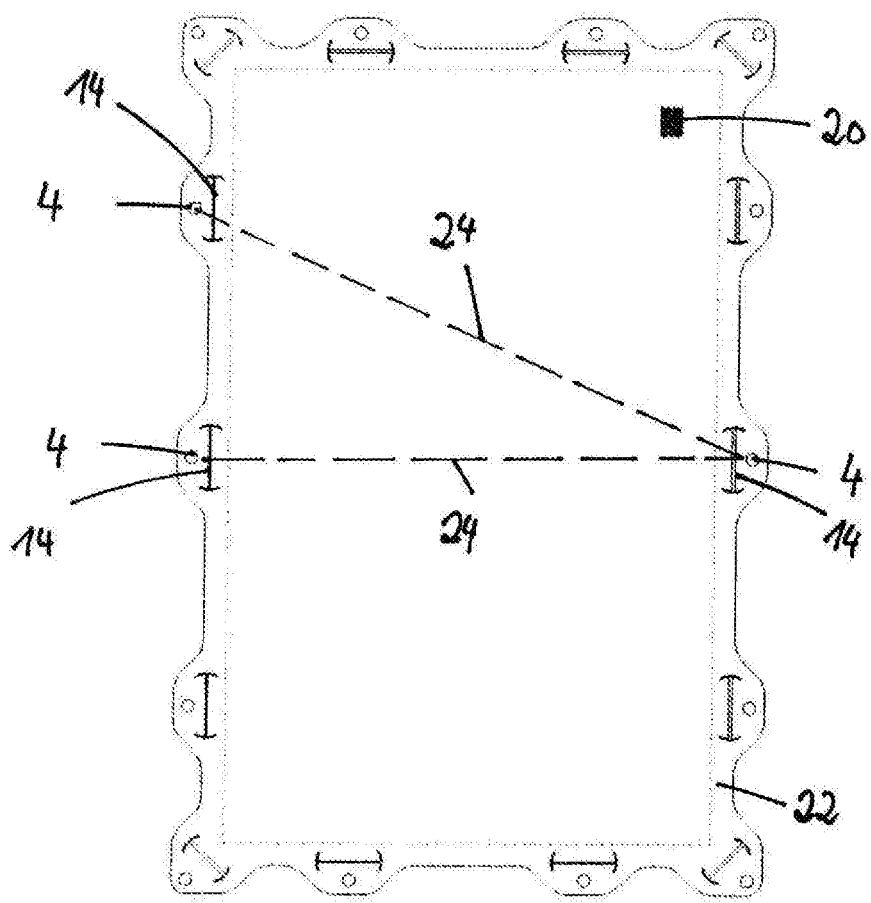
FIG. 2 shows a view of a metal sheet with outer edge, in which the attachment points and the contour cuts are arranged.

FIG. 2 shows one embodiment of a metal sheet 2 in the form of a perforated sheet. The perforation pattern 20 of the perforated sheet is only indicated in the small rectangle.

In FIG. 2, two connection lines 24 are indicated by broken lines, by which one attachment point 4 on the right side of the metal sheet 2 is connected to two attachment points 4, which are situated on the opposite side of the metal sheet 2. The connection lines 24 show that these always run across the contour cuts 14.

The metal sheet 2 has an outer edge 22 in which all the attachment points 4 as well as the corresponding contour cuts 14 in the exemplary embodiment are arranged. In this way, the large sheet surface inside the outer edge 22 in the exemplary embodiment may be used as a ventilation surface of a cover grille of the radiator of a motor vehicle.

Figure 3:
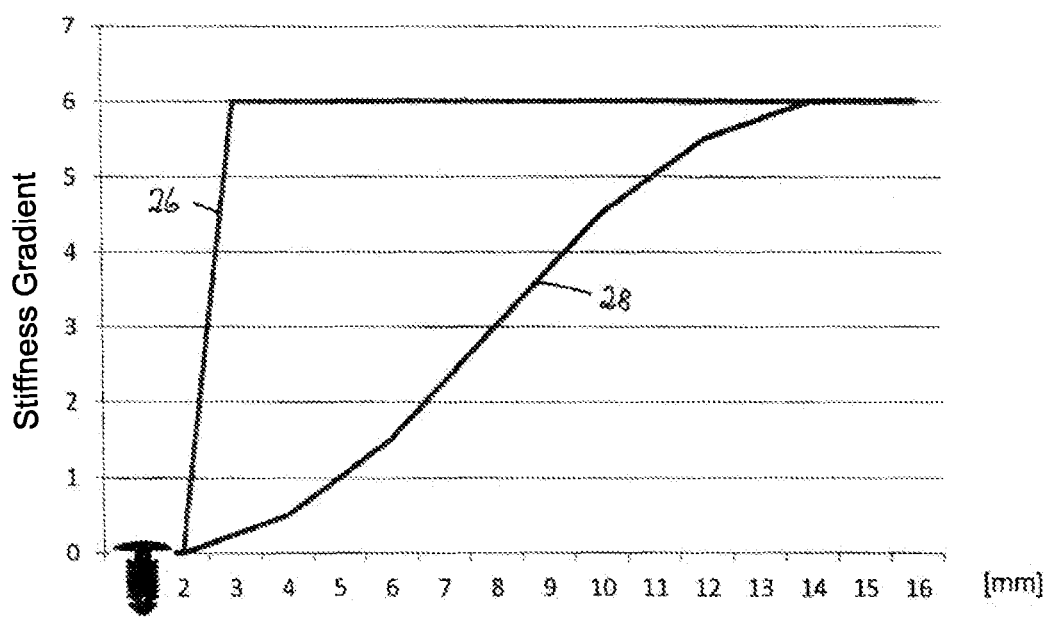
FIG. 3 is a graph showing how the stiffness gradient is altered by making a contour cut in a metal sheet.

FIG. 3 shows a graph in which the function 26 shows how the stiffness gradient in a metal sheet 2 behaves in dependence on the distance from an attachment point 4 before the contour cut 14 has been made in the metal sheet 2. The stiffness gradient in the region between two and three millimeters distance from the attachment point 4 has a very steep curve, after which at increasing distance it settles down at a constant level. By contrast with this, the stiffness gradient after making the contour cut 14 has a significantly flatter curve, shown with the aid of the function 28. Here, the stiffness of the sheet attains the stiffness level of the metal sheet 2 before making the contour cut 14 only at a distance of around fourteen millimeters, while this stiffness level without the contour cut 14 was attained already at a distance of around three millimeters. Owing to the contour cut 14, therefore, the stiffness gradient becomes increasingly flat due to the increasing distance from the attachment point 4.

The invention is not limited to the above exemplary embodiment. It will present the skilled person with no difficulties to modify the exemplary embodiment in a way that appears suitable to him in order to adapt it to a specific application.

What is claimed is:

1. A metal sheet (2) comprising attachment points (4) configured to attach the metal sheet (2) to a support structure (12), the metal sheet (2) further comprising a contour cut (14) introduced in a sheet surface of the metal sheet (2), wherein the contour cut (14) extends transversely to a connection line (24) extending between a first and a second one of the attachment points (4), wherein the contour cut (14) that is positioned along the connection line (24) is located adjacent to the first attachment point (4) such that a vibration line that would extend as far as the first attachment point (4) if the contour cut (14) were not present is interrupted by the contour cut (14), wherein the contour cut (14) is arranged in an area of stress transition from the first attachment point (4) to the freely vibrating sheet, wherein the area of stress transition extends up to 16 mm away from the first attachment point (4).

2. The metal sheet (2) according to claim 1, wherein the contour cut (14) comprises opposed ends (18) in a direction transverse to the connection line (24) and the ends (18) open into cut lines (16) extending in an arc shape around the ends (18) toward the connection line (24), respectively.

3. The metal sheet (2) according to claim 1, wherein the metal sheet (2) is a perforated sheet.

4. The metal sheet (2) according to claim 1, wherein the attachment points (4) and the contour cut (14) are arranged in the area of the outer edge (22) of the metal sheet (2).

5. The metal sheet (2) according to claim 1, further comprising relieving cuts in the sheet surface.

6. The metal sheet (2) according to claim 1, wherein the metal sheet (2) consists of metal and wherein the contour cut (14) passes all the way through a thickness of the metal sheet (2).

* * * * *